United States Patent [19]

Betzer et al.

[11] 4,013,419

[45] Mar. 22, 1977

[54] DIGESTION BOMB

[76] Inventors: Peter R. Betzer, 1830 7th St. North, St. Petersburg, Fla. 33704; Donald Eggimann, 2869 60th St. North, St. Petersburg, Fla. 33710

[22] Filed: Jan. 30, 1976

[21] Appl. No.: 653,756

[52] U.S. Cl. .................................... 23/259; 73/191; 215/329

[51] Int. Cl.² .................. B65D 41/04; G01N 31/12

[58] Field of Search ........... 23/259; 73/190 R, 191; 215/341, 329, DIG. 1

[56] References Cited

UNITED STATES PATENTS

| | | | |
|---|---|---|---|
| 662,143 | 11/1900 | Carpenter | 73/191 |
| 704,482 | 7/1902 | Livingstone | 215/329 X |
| 3,773,468 | 11/1973 | Hubbard et al. | 23/259 |
| 3,933,440 | 1/1976 | Woolley | 23/259 |

*Primary Examiner*—Robert M. Reese

[57] ABSTRACT

A digestion bomb assembly for chemical treatment of organic and inorganic substances comprising an inert container including a cylindrically shaped threaded container portion and an inert cap or closure including a cylindrically shaped threaded cap portion dimensioned and configured for cooperative screwing engagement with the threaded container portion. The container further includes a rim portion and the cap further includes a sealing portion defining a surface correspondingly disposed for sealing engagement with the rim portion when the cap is screwed substantially fully onto the container. A collar is disposed in substantially surrounding relationship to the cap and container to provide structural support thereto.

2 Claims, 3 Drawing Figures

DIGESTION BOMB

BACKGROUND OF THE INVENTION

1. Field of the Invention

This invention relates to a digestion bomb assembly for the chemical treatment of organic and inorganic substances.

2. Description of the Prior Art

A commonly found problem in the field of analytical chemistry is that in the chemical treatment of organic or inorganic materials, the reaction product often contains metallic contamination from a metal digestion bomb in which the chemical treatment is performed. The digestion bombs found in the prior art generally are constructed of metal or steel jackets which encase the digestion vessels to give them the necessary mechanical rigidity to successfully withstand repeated digestions. However, the use of such metal or steel containers in analytical reactions has resulted in the inherent disadvantage of introducing contamination. When metal or steel parts are used, the elements iron, manganese, magnesium, copper, chromium, lead, and nickle in the reaction products cannot be measured in small quantities.

Attempts to replace the metal or steel containers with containers composed of an inert substance have failed because of the loss of the mechanical rigidity that was provided by having steel or metal containers. The use of inert substances, such as a plastic or more specifically, Teflon, results in almost immediate distortion of the container brought about by the stress created by repeated heating and cooling. This repeated heating and cooling causes the container to loose its shape and become unusable after a relatively few digestions.

Another problem commonly encountered in the use of a digestion bomb for the chemical treatment of organic and inorganic materials is the loss of volatile elements. The digestion bombs utilized in the past have incorporated O-rings or sealing liners that are quite often separately attached to the containers and not integrally formed thereon. These types of seals are susceptible to warping and breaking as is often common with such types of sealing members.

In summary, there is a need for a digestion bomb capable of providing a chemically inert, contamination-free environment for the sample during treatment, capable of insuring containment of volatile elements or compounds during decomposition of the sample, and incorporating into its design simplicity and mechanical rigidity such that the first two capabilities would be assured over an extended life span.

SUMMARY OF THE INVENTION

This invention relates to a digestion bomb assembly for chemical treatment of organic and inorganic substances without mechanical contamination and the loss of volatile elements. The digestion bomb comprises a container formed of an inert material including a cylindrically shaped threaded container portion and an inert cap or closure including a cylindrically shaped threaded cap portion dimensioned and configured for cooperative screwing engagement with the threaded container portion. The container and the cap are preferably molded of Teflon. The container further includes a rim portion and the cap further includes a sealing portion defining a surface correspondingly disposed for sealing engagement with the rim portion when the cap is screwed substantially fully onto the container. A collar is disposed in substantially surrounding relationship to the cap and container to provide structural support thereto. The collar is preferably formed from a general purpose acrylic.

A substantial part of the rim portion of the container defines an outwardly protruding wedge projection. The sealing portion of the cap comprises a cavity having an angled edge configured and dimensioned to receive the wedge projection of the container. The wedge projection has a substantially triangular-shaped cross sectional configuration with its most outwardly protuding end relative to said rim portion disposed flushly along the inner wall of the container. The wedge projection is disposed in sealing engagement with the angled edge of the sealing portion of the cap when the cap is screwed substantially fully onto the container.

The above described unique construction and design of the digestion bomb assembly provides a chemically inert, contamination-free environment for the sample during treatment. It also insures containment of volatile elements or compounds during decomposition of the sample, and also provides a digestion bomb that is simple and mechanically rigid.

The bomb is constructed of only metal-free plastic materials. Teflon may be used as the construction material for the main body of the bomb due to its inert properties and its metal-free composition. In place of the metal or steel jackets found in the prior art digestion bombs which are used to encase the bombs to give them mechanical rigidity, the removable acrylic collar is used. This collar is placed around the Teflon container and cap to prevent them from distorting due to the stress created by repeated heating and cooling. The acrylic collar contains no metal contamination while providing the necessary support for the Teflon container and cap. Without such a collar, the vessel would tend to lose its shape and become unusable after a relatively few digestions.

Several features are incorporated into the design which result in the ability of the vessel to maintain a proper seal through repeated usage while withstanding high levels of internal pressure. These features include: the use of a threaded cap or closure with coarse general purpose Acme screw threads, the machining of a special wedge-type sealing surface on that part of the cap and container that come in contact when the cap is screwed substantially fully onto the container, the use of the acrylic collar to insure that the container and cap do not distort and cause the failure of the screw threads to hold the cap in place on the sealing surface of the container.

Finally, the bomb has been designed to provide a long life span. Each of the criteria that have been mentioned in the preceding disclosure enhance this feature. As a result, the seal comprising the wedge-shaped projection is machined as a part of the cap and the container. This simplifies the container by making the use of O-rings or sealing liners unnecessary. As the container is used, this seal becomes more compatible rather than warping or breaking as often is the case with other seals used in the prior art devices. In addition, the use of the acrylic collar supplies the necessary mechanical rigidity to hold the container and cap in place. This simple function prevents the container and cap from distorting which usually causes thread and seal damage when the collar is not used. Furthermore, the use of this collar compensates for the fact that the container is constructed out of an inert material such as Teflon which, by itself, lacks mechanical rigidity. The combination of these above-mentioned features are therefore necessary to increase the life of the container while insuring that the bomb is contamination-free and capable of maintaining a proper seal.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention reference should be had to the following detailed description taken in connection with the accompanying drawings in which.

Similar reference characters refer to similar parts throughout the several views of the drawings.

DETAILED DESCRIPTION

Figure 1:
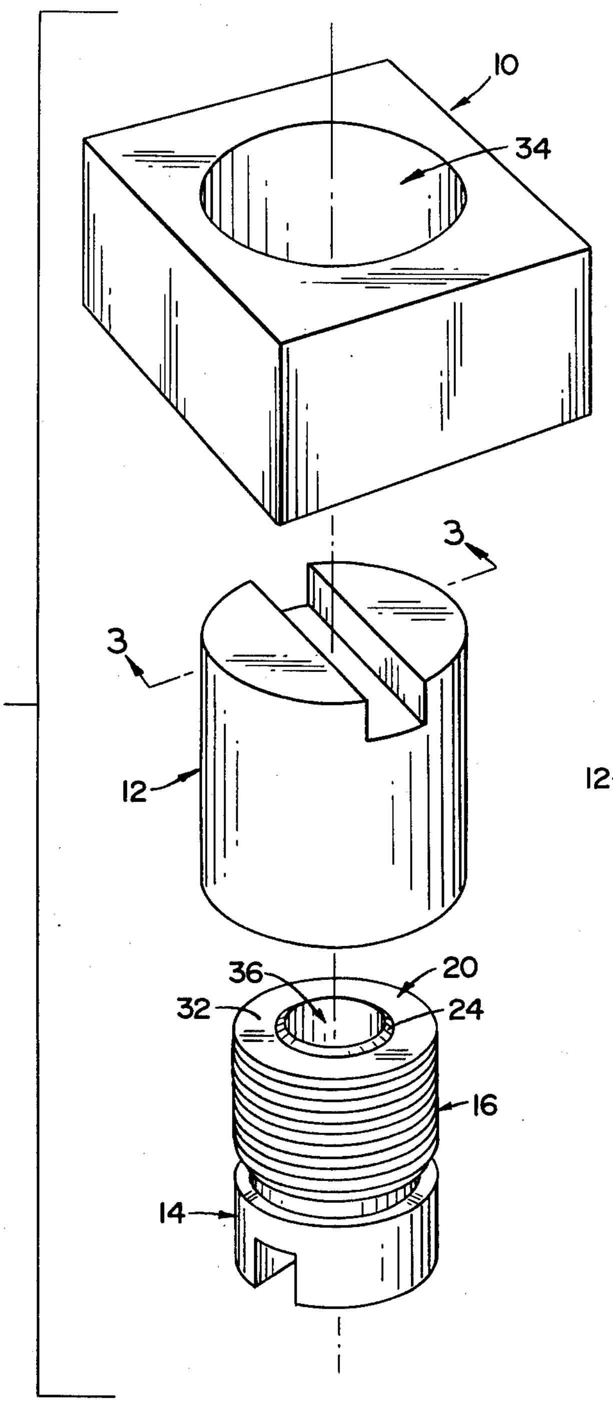
FIG. 1 is an overall exploded perspective view of the digestion bomb assembly with its removable parts disengaged from each other.
Figure 2:
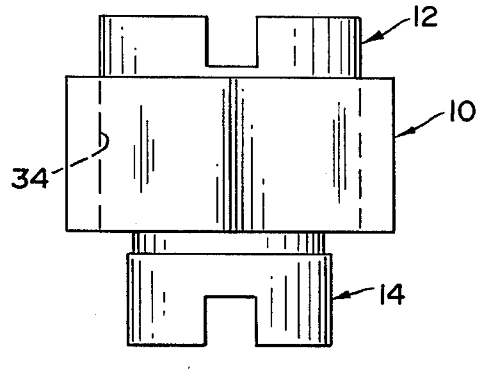
FIG. 2 is a side view of an assembled digestion bomb assembly.

FIG. 1 shows a digestion bomb assembly for chemical treatment of organic and inorganic substances. The digestion bomb assembly comprises container means 14 including a cylindrically shaped threaded container portion 16 and cap means 12 including a cylindrically shaped threaded cap portion 18 dimensioned and configured for cooperative screwing engagement with the threaded container portion 16. The container means 14 further includes a rim portion 20 and the cap means further includes a sealing portion 22 defining a surface correspondingly disposed for sealing engagement with the rim portion 20 when the cap means 12 is screwed substantially fully onto the container means 14. A collar means 10 is disposed in substantially surrounding relationship to cap 12 and container means 14 to provide structural support thereto.

The cylindrically shaped threaded container portion 16 is positioned on the upper neck portion of the container means 14 and is integrally formed thereon. The threaded portion 16 is defined by a continuous single helical thread formed on the cylindrically shaped container means 14 with the upper end of the thread terminating on rim portion 20.

Figure 3:
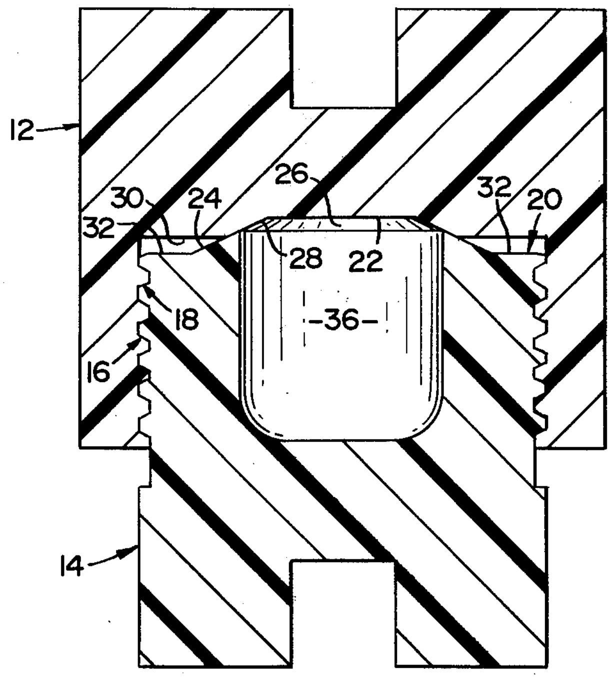
FIG. 3 is a cross sectional view taken along sectional line (3—3) of FIG. 1.

At least a part of the rim portion 20 along its radial dimension defines an outwardly protruding wedge projection 24. This wedge projection 24 has a substantially triangular-shaped cross sectional configuration with its most outwardly protruding end relative to the rim portion disposed flush along the inner wall of the container, as shown in FIG. 3. As shown in FIG. 1, the wedge projection 24 is cylindrical in configuration and is disposed adjacent to the interior diameter of the rim portion 20. However, this wedge projection could be disposed in a cylindrical manner along any of the diameters of the rim portion disposed along the radial dimensions thereof.

The sealing portion 22 of cap means 12 comprises a cylindrically shaped cavity 26 having an angled edge 28 which is configured and dimensioned to receive the wedge projection 24.

The sealing of the cap means 12 to the container means 14 is accomplished by having the threads of the container means 14 rotatably engage the threads of the cap means 12 until the wedge projection 24 of the container means 14 sealingly engages the angled edge 28 of the cap means 12. The remainder of the sealing surface of the cap means 12 that is not formed into the cavity 26 defines a flat cap surface 30 which is disposed in spaced apart relation to the part of the rim portion 20 which is not formed into the wedge projection 24 or flat container portion 32. The engagement of the wedge projection 24 with the cap means 12 greatly increases the quality and reliability of the sealing of the cap means 12 to the container means 14 over that which would normally be found in two flat surfaces engaging each other. The wedge projection 24 is forced against the angled edge 26 to form a very tight seal which assures the necessary sealing required for the chemical treatment herebefore described. The wedge projection 24 is forced against the cap means 12 by continuing to screw the cap means 12 onto the container means 14 until the interior peripheral surfaces of the corresponding sealing parts engage each other. Normally, if the seal was totally dependent upon the engagement of the threads of the cap means 12 with the threads of the container means 14, the diameter of the threaded inner walls of the cap means 12 would have to be very precisely machined to correspond to the diameter of the exterior threaded surface of the container means 14. However, the wedge type engagement herebefore described allows for some increases in tolerances of machining along with forming a very reliable seal in which the loss of volatile elements is controlled even under high levels of internal pressure and with repeated usage.

The container means 14 and the cap means 12 are constructed of only metal-free plastic materials. Preferably, Teflon is used as the construction for the main body of the bomb due to its inert properties and its metal-free composition. To provide support for the container means and cap means which are composed of plastic, the collar means 10 is removably placed around the cap means 12 to prevent it from distorting due to the stress created by repeated heated and cooling. The exterior surface can be configured and dimensioned in any manner to provide a supporting frame. In the preferred embodiment shown in FIG. 1, the collar means 10 is configured in the shape of a rectangular box. Centrally located within the collar means 10 is an aperture or bore 34 which is configured and dimensioned to receive the cap means 12.

A reaction cavity 36 is centrally formed along the longitudinal center line of the container means 14 and defines the interior dimensions of rim portion 20.

The container means 14 and cap means 12 can be composed of any inert material and as herebefore mentioned, the preferred embodiment is composed of Teflon. More specifically, the vessel is constructed from a premium grade virgin molded Teflon rod. This rod is heated for 4 hours at 100° C. to minimize shrinkage. When using standard machine shop procedures, the bottom and top are machined in accordance with the attached drawings. Special care must be taken in the machining of the sealing surfaces to obtain an accurate angle of the wedge seal and high surface finish of at least 32 micro inches on the seal surfaces. The collar means 10 is made of general purpose acrylic sheet cut to size and bored out to fit around the cap means 12.

In operation, samples are placed within the reaction cavity 36 of the container means 14 with reagents, the cap means 12 is twisted into place on the container means 14 thereby forming a seal, the collar means 10 is placed over the cap means 12, and the entire vessel is submerged in a water bath and heated to the desired reaction temperature.

After digestion, the resulting solution is cooled, diluted, and analyzed by common techniques. The following elements have been measured successfully in microgram and in many cases, picogram levels by atomic absorption spectroscopy from samples decomposed within the bomb. These are: silicon, aluminum, iron, magnesium, manganese, calcium, copper, chromium, lead, nickel, strentium, cadmium, and calcium. These elements were measured in samples of organic matter, aluminosilicates, refractory oxides, and metal ores using a variety of organic and inorganic reagents. Control samples were used to determine that the level of background contamination attributable to the vessel was immeasurable by sensitive, flameless atomic absorption techniques. In addition, the excellent recovery of the volatile elements, silicon and aluminum (volatile in the presence of hydrofluoric acid), could only have been achieved if the sample was decomposed in a sealed chamber. Finally, because no metal or steel parts are used in the construction of this all plastic digestive bomb, the elements iron, magnesium, manganese, copper, chromium, lead, and nickel could be measured in small quantities with the lack of these elements in the proximity with the sample.

It will thus be seen that the objects set forth above, among those made apparent from the preceding description, are effectively attained, and since certain changes may be made in carrying out the above method and article without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A digestion bomb assembly comprising, in concentric relationship, a cylindrical container including a cylindrical cavity and a sealable annular rim portion, a cylindrical cap threadably and sealingly engagable with said container, said cap including a sealable cylindrical shaped portion having an angled edge configured and dimensioned to receive the said rim portion of said container, and a removable rigid collar encircling the container and the cap at the threaded portion thereof, said container and said cap being composed of an inert metal-free plastic material and said collar being composed of a plastic material.

2. The digestion bomb assembly of claim 1 wherein said annular rim portion defines an outwardly protruding wedge projection having a substantially triangular-shaped cross-sectional configuration with its most outwardly protruding end relative to said rim portion disposed along the inner wall of said container.

* * * * *